US012153436B2

(12) United States Patent
Li et al.

(10) Patent No.: US 12,153,436 B2
(45) Date of Patent: Nov. 26, 2024

(54) METHODS AND SYSTEMS FOR DEALIASING RADAR RANGE RATE MEASUREMENTS USING MACHINE LEARNING

(71) Applicant: FORD GLOBAL TECHNOLOGIES, LLC, Dearborn, MI (US)

(72) Inventors: Minhan Li, Raleigh, NC (US); Fnu Ratnesh Kumar, Chino Hills, CA (US); Xiufeng Song, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 340 days.

(21) Appl. No.: 17/679,384

(22) Filed: Feb. 24, 2022

(65) Prior Publication Data

US 2023/0266768 A1 Aug. 24, 2023

(51) Int. Cl.
| | | |
|---|---|---|
| G05D 1/00 | (2024.01) | |
| G01S 7/40 | (2006.01) | |
| G01S 13/58 | (2006.01) | |
| G01S 13/90 | (2006.01) | |
| G01S 13/931 | (2020.01) | |
| G06N 20/20 | (2019.01) | |

(52) U.S. Cl.
CPC .............. *G05D 1/0223* (2013.01); *G01S 7/40* (2013.01); *G01S 13/9004* (2019.05); *G01S 13/931* (2013.01); *G05D 1/0088* (2013.01); *G06N 20/20* (2019.01); *G01S 13/588* (2013.01)

(58) Field of Classification Search
CPC ...... G01S 7/40; G01S 13/9004; G01S 13/931; G01S 13/588; G06N 20/20
See application file for complete search history.

(56) References Cited

U.S. PATENT DOCUMENTS

| 10,732,261 | B1* | 8/2020 | Wang ..................... G01S 7/417 |
| 11,921,573 | B2* | 3/2024 | Vijayaraghavan ........................... G06F 11/0703 |
| 2018/0356498 | A1* | 12/2018 | Stachnik ............... G01S 7/2921 |

(Continued)

FOREIGN PATENT DOCUMENTS

JP 2019030623 A 2/2019

OTHER PUBLICATIONS

PCT Search Report for International Application No. PCT/2022/052491, Completed Dated Apr. 24, 2024, 4 pages.

*Primary Examiner* — Hunter B Lonsberry
*Assistant Examiner* — Harrison Heflin
(74) *Attorney, Agent, or Firm* — Frank A. MacKenzie; Brooks Kushman P.C.

(57) ABSTRACT

Systems may include at least one processor configured to determine a predicted value of an unwrap factor using a machine learning model, wherein the machine learning model is a trained machine learning model configured to provide a predicted value of an unwrap factor for dealiasing a measurement of range rate of a target object as an output, dealiase a measurement value of range rate from a radar of an autonomous vehicle (AV) based on the predicted value of the unwrap factor to provide a true value of range rate, and control an operation of the AV in a real-time environment based on the true value of range rate. Methods, computer program products, and autonomous vehicles are also disclosed.

17 Claims, 9 Drawing Sheets

(56) References Cited

U.S. PATENT DOCUMENTS

2020/0249315 A1\* 8/2020 Eshet .................... G01S 13/343
2023/0086891 A1\* 3/2023 Bar Shalom .......... G01S 13/931
    342/70

\* cited by examiner

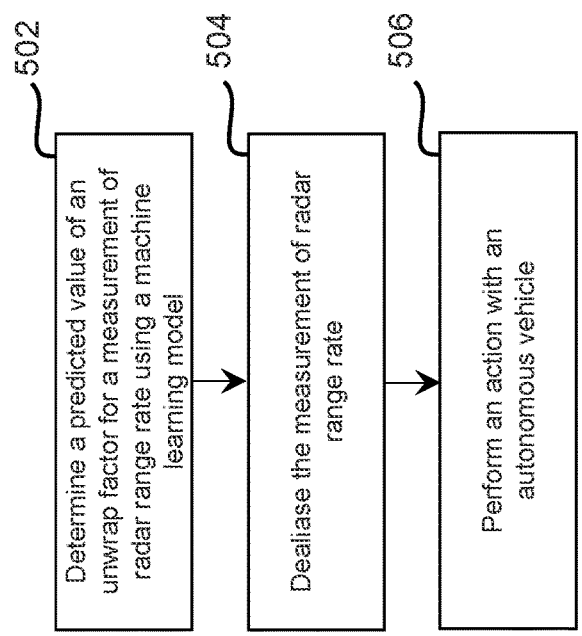

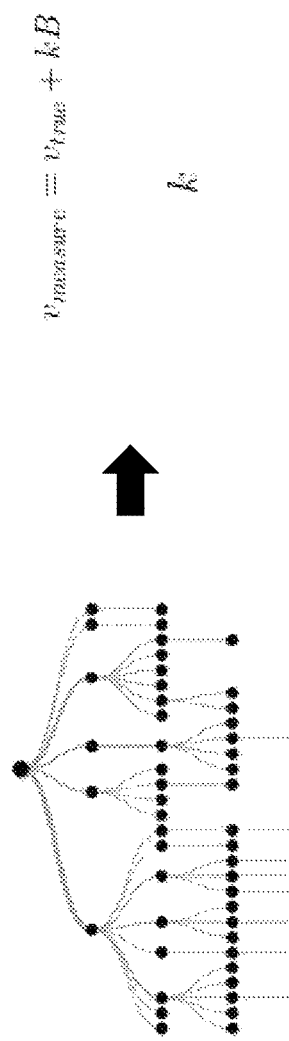
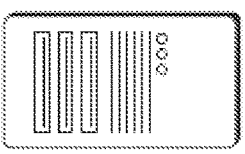
600
615
Generate a random forest machine learning model
620
Determine a predicted value of an unwrap factor using the machine learning model
Radar Dealiasing System
102
FIG. 6B

METHODS AND SYSTEMS FOR DEALIASING RADAR RANGE RATE MEASUREMENTS USING MACHINE LEARNING

BACKGROUND

1. Field

This disclosure relates generally to aspects of autonomous vehicles and, in some non-limiting embodiments, to dealiasing measurements of radar range rate using a machine learning technique.

2. Technical Considerations

An autonomous vehicle (e.g., a driverless car, a driverless auto, a self-driving car, a robotic car, etc.) is a vehicle that is capable of sensing an environment of the vehicle and traveling (e.g., navigating, moving, etc.) in the environment without manual input from an individual. An autonomous vehicle (AV) uses a variety of techniques to detect the environment of the autonomous vehicle, such as radar, laser light, Global Positioning System (GPS), odometry, and/or computer vision. In some instances, an autonomous vehicle uses a control system to interpret information received from one or more sensors, to identify a route for traveling, to identify an obstacle in a route, and to identify relevant traffic signs associated with a route.

In an AV, a radar may measure a range of a target object, one or more angles of the target object compared to the radar, and/or a range rate of the target object to determine characteristics of the target object and then operate the AV with regard to the target object. Range rate (e.g., Doppler velocity or radial velocity), may refer to a rate at which the target object's range from the radar changes with respect to the position of the radar.

SUMMARY

Provided are systems, methods, products, apparatuses, and/or devices for dealiasing measurements of radar range rate using machine learning.

According to some non-limiting embodiments, provided is a system comprising a memory; and at least one processor coupled to the memory and configured to: determine a predicted value of an unwrap factor using a machine learning model, wherein the machine learning model is a trained machine learning model configured to provide a predicted value of an unwrap factor for dealiasing a measurement of range rate of a target object as an output; dealiase a measurement value of range rate from a radar of an autonomous vehicle (AV) based on the predicted value of the unwrap factor to provide a true value of range rate; and control an operation of the AV in a real-time environment based on the true value of range rate.

According to some non-limiting embodiments, provided is a computer program product comprising at least one non-transitory computer-readable medium comprising one or more instructions that, when executed by at least one processor, cause the at least one processor to: determine a predicted value of an unwrap factor using a machine learning model, wherein the machine learning model is a trained machine learning model configured to provide a predicted value of an unwrap factor for dealiasing a measurement of range rate of a target object as an output; dealiase a measurement value of range rate based on the predicted value of the unwrap factor to provide a true value of range rate; and control an operation of an autonomous vehicle (AV) in a real-time environment based on the true value of range rate.

According to some non-limiting embodiments, provided is a method, comprising: determining, with at least one processor, a predicted value of an unwrap factor using a machine learning model, wherein the machine learning model is a trained machine learning model configured to provide a predicted value of an unwrap factor for dealiasing a measurement of range rate of a target object as an output; dealiasing, with at least one processor, a measurement value of range rate based on the predicted value of the unwrap factor to provide a true value of range rate; and control, with at least one processor, an operation of an autonomous vehicle (AV) in a real-time environment based on the true value of range rate.

BRIEF DESCRIPTION OF THE DRAWINGS

Additional advantages and details are explained in greater detail below with reference to the exemplary embodiments that are illustrated in the accompanying schematic figures, in which:

FIG. 5 is a flowchart of a non-limiting embodiment of a process for dealiasing measurements of radar range rate using machine learning; and FIGS. 6A-6D are diagrams of a non-limiting embodiment of an implementation of a process for dealiasing measurements of radar range rate using machine learning.

DESCRIPTION

Figure 1:
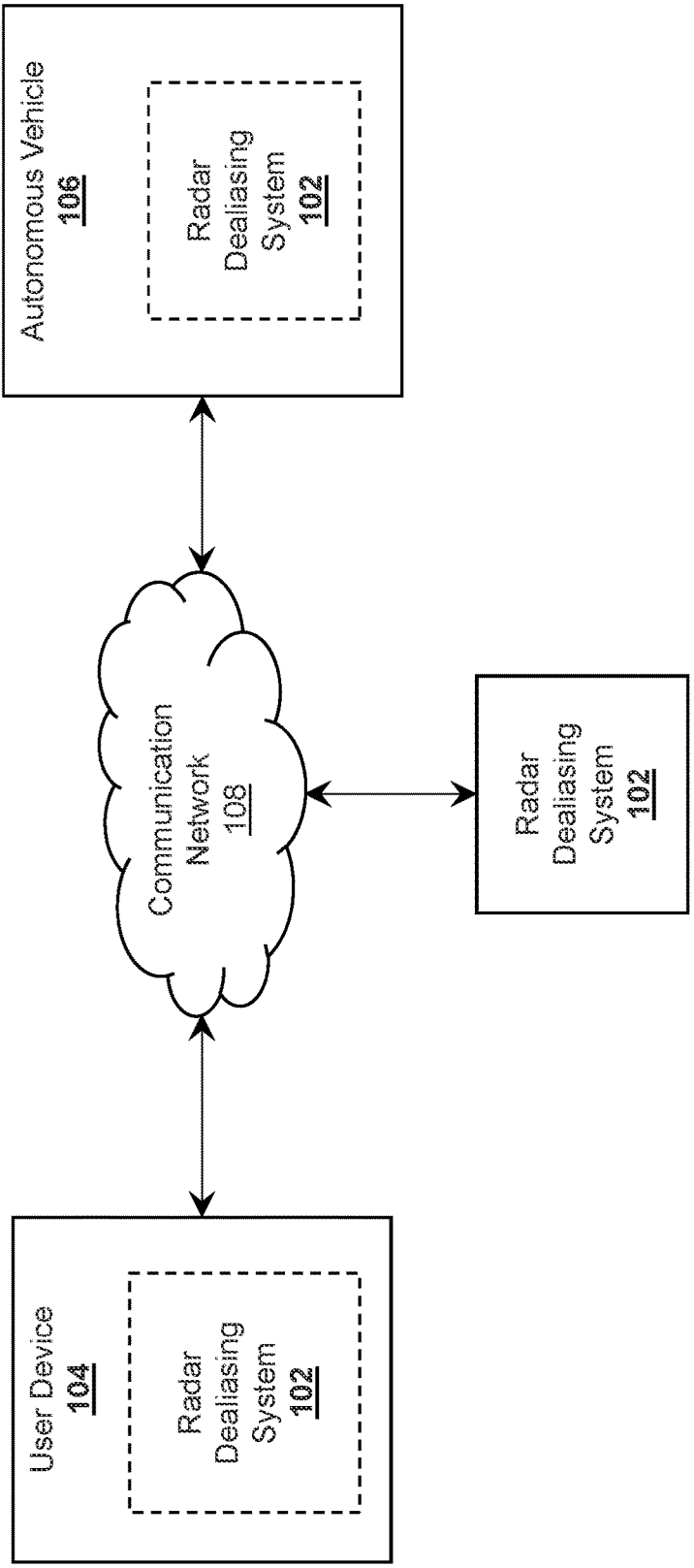
FIG. 1 is a diagram of a non-limiting embodiment of an environment in which systems, methods, and/or computer program products, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." As used in the specification and the claims, the singular form of "a," "an," and "the" include plural referents, such as unless the context clearly dictates otherwise. Additionally, as used herein, the terms "set" and "group" are intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. Further, the phrase "based on" is intended to mean "based at least partially on" unless explicitly stated otherwise. Further, the phrase "based on" may mean "in response to" and be indicative of a condition for automatically triggering a specified operation of an electronic device (e.g., a processor, a computing device, etc.) as appropriately referred to herein.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones, and the like. An "autonomous vehicle" is a vehicle having a processor, programming instructions, and drivetrain components that are controllable by the processor without requiring a human operator. An autonomous vehicle may be fully autonomous in that the autonomous vehicle does not require a human operator for most or all driving conditions and functions. In some non-limiting embodiments, the autonomous vehicle may be semi-autonomous in that a human operator may be required in certain conditions or for certain operations, or that a human operator may override the vehicle's autonomous system and may take control of the vehicle.

As used herein, the term "computing device" may refer to one or more electronic devices configured to process data. A computing device may, in some examples, include the necessary components to receive, process, and output data, such as a processor, a display, a memory, an input device, a network interface, and/or the like. In some non-limiting embodiments, a computing device may be a mobile device. As an example, a mobile device may include a cellular phone (e.g., a smartphone or standard cellular phone), a portable computer (e.g., a tablet), a wearable device (e.g., watches, glasses, lenses, clothing, and/or the like), a personal digital assistant (PDA), and/or other like devices. In some non-limiting embodiments, a computing device may be a computer that is not portable (e.g., is not a mobile device), such as a desktop computer (e.g., a personal computer).

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, mobile devices, desktop computers, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "user interface" or "graphical user interface" may refer to a display generated by a computing device, with which a user may interact, either directly or indirectly (e.g., through a keyboard, mouse, touchscreen, etc.).

An operator of an autonomous vehicle (AV) may receive a measurement from a radar that provides information regarding a speed and/or other characteristics of a target object. The measurement may include a measurement of radar range rate of the target object. In some non-limiting embodiments, operation of the AV may be controlled based on the measurement of radar range rate of the target object.

However, aliasing may occur with regard to measurements of radar range rate. For example, if a sampling frequency of the radar is lower than a Nyquist frequency (e.g., a Nyquist frequency according to the Nyquist-Shannon sampling theory) aliasing may occur. In some non-limiting embodiments, the measurement is aliased, such that the measurement value of radar range rate is incorrect when compared of a true value of radar range rate, by a multiple of velocity ambiguity (e.g., an equivalent sampling frequency in the radar range rate domain). This may be seen according to the following equation:

$$v_{measure} = v_{true} + kB$$

where k is the unwrap factor and B is the velocity ambiguity. In order to obtain a true value of radar range rates, dealiasing may be performed on a measurement of radar range rate. For example, during dealiasing, a value of the unwrap factor may be inferred for each range rate measurement and a corresponding value of velocity ambiguity.

In some instances, dealiasing methods may utilize empirical geometry based rules to infer values of the unwrap factor and velocity ambiguity. However, such dealiasing methods may rely heavily on results of tracking and association with regard to a target object and/or may require an application of subjective knowledge.

In some non-limiting embodiments, although the unwrap factor could be any integer number in theory, the unwrap factor may be practically constrained. In some non-limiting embodiments, it may be assumed that a maximum speed of a target object speed is about 100 miles per hour. Accordingly, a relative speed between an autonomous vehicle and a target object may be within a range of −73.8 and 73.8 meters per second. In some non-limiting embodiments, bandwidth for near range mode of a radar may be within 22 to 32 meters per second and bandwidth for far range mode of a radar may be around 40 meters per second. In one example, the value of the unwrap factor may be bounded within a range of −2 to 2. In another example, since a velocity of an autonomous vehicle and velocity of a target object may be unlikely to be on a same line, the value of the unwrap factor may be within a range of −1 to 1. In this way, inference with a machine learning model may be recast as a classification problem within a set {−1, 0, 1}.

The present disclosure provides systems, methods, and computer program products that dealiase measurements of radar range rate using machine learning. In some non-limiting embodiments, the present disclosure includes a radar dealiasing system that includes a memory and at least one processor coupled to the memory and configured using a machine learning model to determine a predicted value of an unwrap factor, wherein the machine learning model is a trained machine learning model configured to provide a predicted value of an unwrap factor for dealiasing a measurement of range rate of a target object as an output, dealiase a measurement value of range rate from a radar of the AV based on the predicted value of the unwrap factor to provide a true value of range rate and control an operation of the AV in a real-time environment based on the true value of range rate.

In some non-limiting embodiments, when dealiasing the measurement value of range rate from the radar of the AV, the at least one processor is configured to determine the true value of range rate based on the predicted value of the unwrap factor, the measurement of range rate from the radar of the AV, and a value of velocity ambiguity. In some non-limiting embodiments, when determining the predicted value of the unwrap factor for dealiasing the measurement of range rate using the trained machine learning model, the at least one processor is configured to provide an input to the trained machine learning model, wherein the input comprises data associated with variance of measurements of range rate of a target object, data associated with a detected position of a target object, data associated with an azimuth angle of a target object, data associated with velocity ambiguity of a target object, data associated with angular acceleration of the AV, data associated with angular velocity of the AV, data associated with linear acceleration of the AV, data associated with linear velocity of the AV, data associated with a tracked position of a target object, data associated with a tracked linear velocity of a target object, data associated with a tracked range rate of a target object, data associated with a time period during which a target object was tracked, data associated with a width of a target object that was tracked, data associated with a length of a target object that was tracked, or any combination thereof, and receive an output from the trained machine learning model based on the input, wherein the output comprises the predicted value of the unwrap factor.

In some non-limiting embodiments, the machine learning model is a random forest machine learning model, and the at least one processor is further configured to train the random forest machine learning model based on a training dataset to provide the trained machine learning model, wherein the training dataset comprises a plurality of measurements of characteristics associated with one or more AVs. In some non-limiting embodiments, when training the random forest machine learning model, the at least one processor is configured to: fit a plurality of random forest models on the training dataset by tuning a plurality of hyperparameters, wherein the plurality of hyperparameters comprise a number of estimators, a maximum tree depth, and a plurality of sample weights. In some non-limiting embodiments, the at least one processor is configured to: validate the trained machine learning model, wherein, when validating the trained machine learning model, the at least one processor is configured to: determine whether the trained machine learning satisfies a threshold value of accuracy with regard to a predicted value of an unwrap factor for dealiasing a measurement of range rate of the target object.

In this way, the radar dealiasing system may provide a more accurate value of the unwrap factor and, therefore, a more accurate value of true radar range rate of a target object. Furthermore, the value true radar range rate may be provided more quickly as compared to prior dealiasing methods, and can, thus, be used effectively with regard to controlling operations of the AV.

Referring now to FIG. 1, FIG. 1 is a diagram of an example environment 100 in which systems, methods, products, apparatuses, and/or devices described herein, may be implemented. As shown in FIG. 1, environment 100 may include radar dealiasing system 102, user device 104, autonomous vehicle 106, and communication network 108.

Radar dealiasing system 102 may include one or more devices capable of communicating with user device 104 and/or autonomous vehicle 106 via communication network 108. For example, radar dealiasing system 102 may include a computing device, such as a server, a group of servers, and/or other like devices.

User device 104 may include one or more devices capable of communicating with radar dealiasing system 102 and/or autonomous vehicle 106 via communication network 108. For example, radar dealiasing system 102 may include a computing device, such as a mobile device, a desktop computer, and/or other like devices. In some non-limiting embodiments, radar dealiasing system 102 may communicate with user device 104 via an application (e.g., a mobile application) stored on user device 104. In some non-limiting embodiments, user device 104 may include one or more sensors (e.g., a LiDAR sensor, a radio frequency identification (RFID) sensor, a light sensor, an image sensor, such as a camera, a laser sensor, a barcode reader, an audio sensor, etc.). In some non-limiting embodiments, radar dealiasing system 102 may be a component of user device 104.

Autonomous vehicle 106 may include one or more devices capable of communicating with radar dealiasing system 102 and/or user device 104 via communication network 108. For example, autonomous vehicle 106 may include a computing device, such as a server, a group of servers, and/or other like devices. In some non-limiting embodiments, radar dealiasing system 102 may be a component of autonomous vehicle 106. In some non-limiting embodiments, user device 104 may be a component of autonomous vehicle 106.

Communication network 108 may include one or more wired and/or wireless networks. For example, communication network 108 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. For example, autonomous vehicle 106 may incorporate the functionality of radar dealiasing system 102 such that autonomous vehicle 106 can operate without communication to or from radar dealiasing system 102. Additionally or alternatively, a set of devices and/or systems (e.g., one or more devices or systems) of environment 100 may perform one or more functions described as being performed by another set of devices and/or systems of environment 100.

Figure 2:
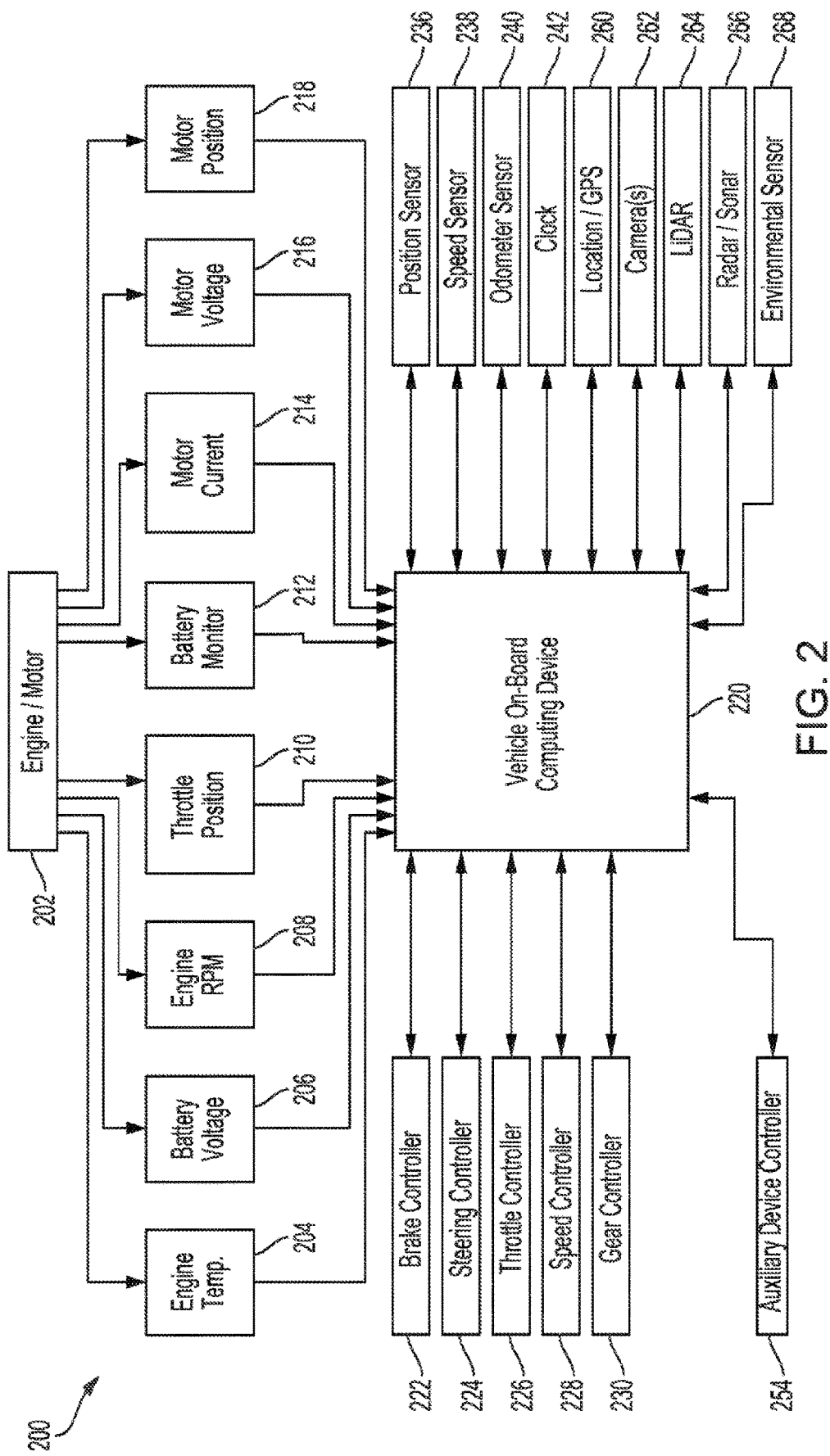
FIG. 2 is a diagram of a non-limiting embodiment of an architecture for an autonomous vehicle.

Referring now to FIG. 2, FIG. 2 is an illustration of an illustrative system architecture 200 for a vehicle. Autonomous vehicle 106 may include a same or similar system architecture as that of system architecture 200 shown in FIG. 2.

As shown in FIG. 2, system architecture 200 may include engine or motor 202 and various sensors 204-218 for measuring various parameters (e.g., characteristics) of the vehicle. In gas-powered or hybrid vehicles having a fuel-powered engine, the sensors may include, for example, engine temperature sensor 204, battery voltage sensor 206, engine rotations per minute (RPM) sensor 208, throttle position sensor 210, and/or a seat occupancy sensor (not shown). In an electric or hybrid vehicle, the vehicle may have an electric motor and may have sensors, such as battery monitor sensor 212 (e.g., to measure current, voltage, and/or temperature of the battery), motor current sensor 214, motor voltage sensor 216, and/or motor position sensors 218, such as resolvers and encoders.

System architecture 200 may include operational parameter sensors, which may be common to both types of vehicles and may include, for example: position sensor 236, such as an accelerometer, gyroscope, and/or inertial measurement unit; speed sensor 238; and/or odometer sensor 240. System architecture 200 may include clock 242 that is used to determine vehicle time during operation. Clock 242 may be encoded into vehicle on-board computing device 220. It may be a separate device or multiple clocks may be available.

System architecture 200 may include various sensors that operate to gather information about an environment in which the vehicle is operating and/or traveling. These sensors may include, for example: location sensor 260 (e.g., a global positioning system (GPS) device); object detection sensors, such as one or more cameras 262; LiDAR sensor system 264; and/or radar and/or sonar system 266. The sensors may include environmental sensors 268, such as a precipitation sensor, an ambient temperature sensor, and/or an acoustic sensor (e.g., a microphone, a phased-array of microphones, and/or the like). The object detection sensors may enable system architecture 200 to detect objects that are within a given distance range of the vehicle in any direction, and environmental sensors 268 may collect data about environmental conditions within an area of operation and/or travel of the vehicle.

During operation of system architecture 200, information is communicated from the sensors of system architecture 200 to vehicle on-board computing device 220. Vehicle on-board computing device 220 analyzes the data captured by the sensors and optionally controls operations of the vehicle based on results of the analysis. For example, vehicle on-board computing device 220 may control: braking via brake controller 222; direction via steering controller 224; speed and acceleration via throttle controller 226 (e.g., in a gas-powered vehicle) or motor speed controller 228, such as a current level controller (e.g., in an electric vehicle); differential gear controller 230 (e.g., in vehicles with transmissions); and/or other controllers, such as auxiliary device controller 254.

Geographic location information may be communicated from location sensor 260 to vehicle on-board computing device 220, which may access a map of the environment including map data that corresponds to the location information to determine known fixed features of the environment, such as streets, buildings, stop signs, and/or stop/go signals. Captured images from cameras 262 and/or object detection information captured from sensors, such as LiDAR sensor system 264, is communicated from those sensors to vehicle on-board computing device 220. The object detection information and/or captured images are processed by vehicle on-board computing device 220 to detect objects in proximity to the vehicle. Any known or to be known technique for making an object detection based on sensor data and/or captured images can be used in the embodiments disclosed in the present disclosure.

Figure 3:
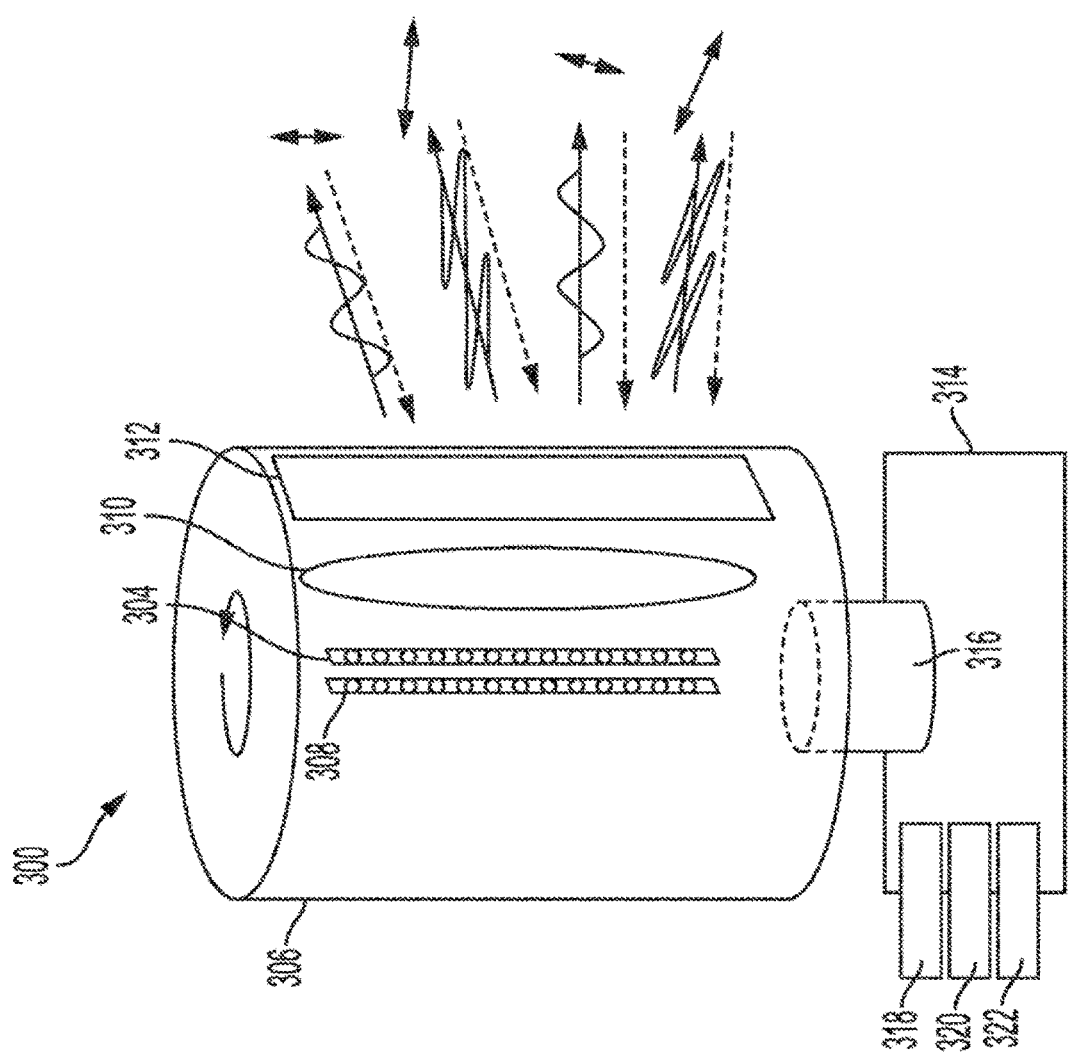
FIG. 3 is a diagram of a non-limiting embodiment of an architecture for a light detection and ranging (LiDAR) system.

Referring now to FIG. 3, FIG. 3 is an illustration of an illustrative LiDAR system 300. LiDAR sensor system 264 of FIG. 2 may be the same as or substantially similar to LiDAR system 300.

As shown in FIG. 3, LiDAR system 300 may include housing 306, which may be rotatable 360° about a central axis, such as a hub or axle of motor 316. Housing 306 may include an emitter/receiver aperture 312 made of a material transparent to light (e.g., transparent to infrared light). Although a single aperture is shown in FIG. 3, non-limiting embodiments of the present disclosure are not limited in this regard. In other scenarios, multiple apertures for emitting and/or receiving light may be provided. Either way, LiDAR system 300 can emit light through one or more of aperture(s) 312 and receive reflected light back toward one or more of aperture(s) 312 as housing 306 rotates around the internal components. In an alternative scenario, the outer shell of housing 306 may be a stationary dome, at least partially made of a material that is transparent to light, with rotatable components inside of housing 306.

Inside the rotating shell or stationary dome is a light emitter system 304 that is configured and positioned to generate and emit pulses of light through aperture 312 or through the transparent dome of housing 306 via one or more laser emitter chips or other light emitting devices. Light emitter system 304 may include any number of individual emitters (e.g., 8 emitters, 64 emitters, 128 emitters, etc.). The emitters may emit light of substantially the same intensity or of varying intensities. The individual beams emitted by light emitter system 304 may have a well-defined state of polarization that is not the same across the entire array. As an example, some beams may have vertical polarization and other beams may have horizontal polarization. LiDAR system 300 may include light detector 308 containing a photodetector or array of photodetectors positioned and configured to receive light reflected back into the system. Light emitter system 304 and light detector 308 may rotate with the rotating shell, or light emitter system 304 and light detector 308 may rotate inside the stationary dome of housing 306. One or more optical element structures 310 may be positioned in front of light emitter system 304 and/or light detector 308 to serve as one or more lenses and/or waveplates that focus and direct light that is passed through optical element structure 310.

One or more optical element structures 310 may be positioned in front of a mirror to focus and direct light that is passed through optical element structure 310. As described herein below, LiDAR system 300 may include optical element structure 310 positioned in front of a mirror and connected to the rotating elements of LiDAR system 300, so that optical element structure 310 rotates with the mirror. Alternatively or in addition, optical element structure 310 may include multiple such structures (e.g., lenses, waveplates, etc.). In some non-limiting embodiments, multiple optical element structures 310 may be arranged in an array on or integral with the shell portion of housing 306.

In some non-limiting embodiments, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

LiDAR system 300 may include power unit 318 to power light emitter system 304, motor 316, and electronic components. LiDAR system 300 may include analyzer 314 with elements, such as processor 322 and non-transitory computer-readable memory 320 containing programming instructions that are configured to enable the system to receive data collected by the light detector unit, analyze the data to measure characteristics of the light received, and generate information that a connected system can use to make decisions about operating in an environment from which the data was collected. Analyzer 314 may be integral with LiDAR system 300 as shown, or some or all of analyzer 314 may be external to LiDAR system 300 and communicatively connected to LiDAR system 300 via a wired and/or wireless communication network or link.

Figure 4:
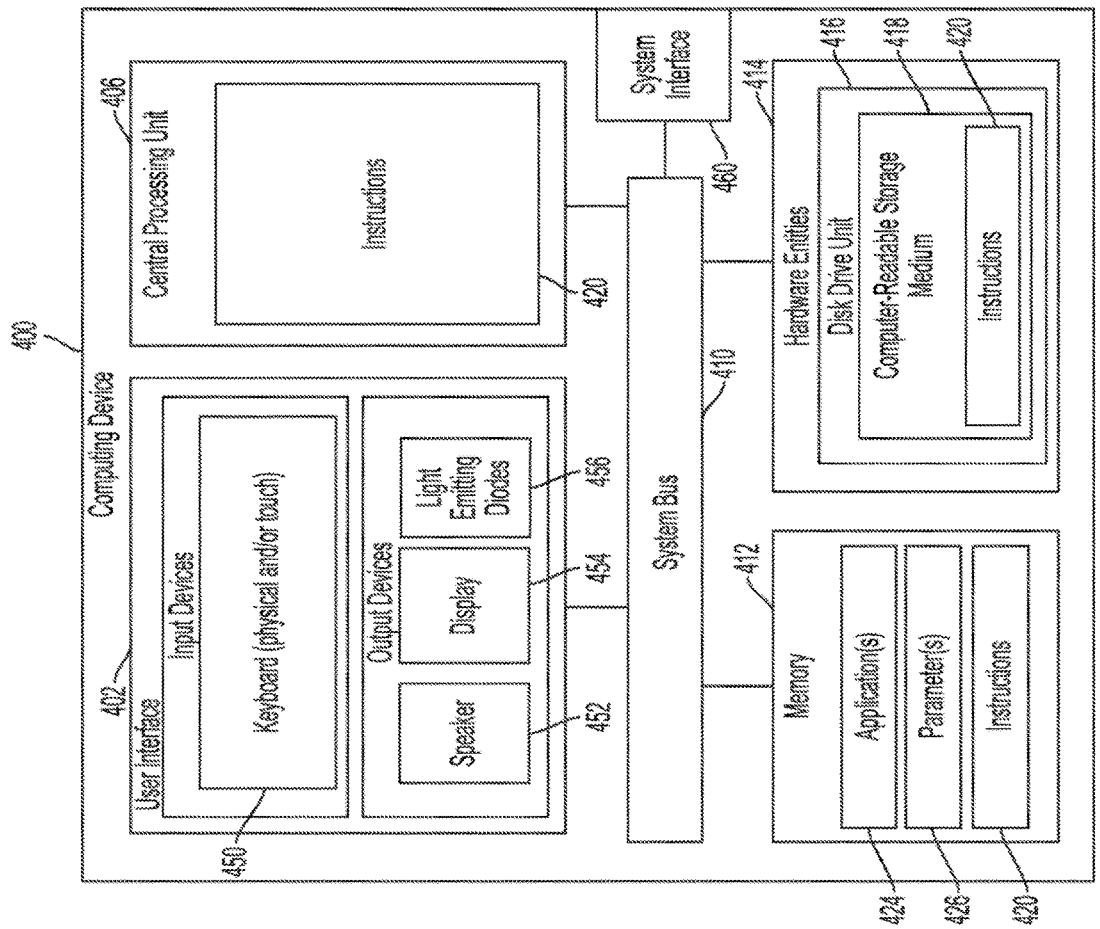
FIG. 4 is a diagram of a non-limiting embodiment of a computing device.

Referring now to FIG. 4, FIG. 4 is a diagram of an architecture for a computing device 400. Computing device 400 can correspond to one or more devices of (e.g., one or more devices of a system of) radar dealiasing system 102, user device 104, and/or one or more devices of autonomous vehicle 106 (e.g., one or more devices of system architecture 200, etc.). In some non-limiting embodiments, one or more devices of (e.g., one or more devices of a system of) radar dealiasing system 102, user device 104, and/or autonomous vehicle 106 (e.g., one or more devices of system architecture 200, etc.) can include at least one computing device 400 and/or at least one component of computing device 400.

The number and arrangement of components shown in FIG. 4 are provided as an example. In some non-limiting embodiments, computing device 400 may include additional components, fewer components, different components, or differently arranged components than those shown in FIG. 4. Additionally or alternatively, a set of components (e.g., one or more components) of computing device 400 may perform one or more functions described as being performed by another set of components of computing device 400.

As shown in FIG. 4, computing device 400 comprises user interface 402, Central Processing Unit (CPU) 406, system bus 410, memory 412 connected to and accessible by other portions of computing device 400 through system bus 410, system interface 460, and hardware entities 414 connected to system bus 410. User interface 402 can include input devices and output devices, which facilitate user-software interactions for controlling operations of computing device 400. The input devices may include, but are not limited to, physical and/or touch keyboard 450. The input devices can be connected to computing device 400 via a wired and/or wireless connection (e.g., a Bluetooth® connection). The output devices may include, but are not limited to, speaker 452, display 454, and/or light emitting diodes 456. System interface 460 is configured to facilitate wired and/or wireless communications to and from external devices (e.g., network nodes, such as access points, etc.).

At least some of hardware entities 414 may perform actions involving access to and use of memory 412, which can be a random access memory (RAM), a disk drive, flash memory, a compact disc read only memory (CD-ROM) and/or another hardware device that is capable of storing instructions and data. Hardware entities 414 can include disk drive unit 416 comprising computer-readable storage medium 418 on which is stored one or more sets of instructions 420 (e.g., software code) configured to implement one or more of the methodologies, procedures, or functions described herein. Instructions 420, application(s) 424, and/or parameter(s) 426 can also reside, completely or at least partially, within memory 412 and/or within CPU 406 during execution and/or use thereof by computing device 400. Memory 412 and CPU 406 may include machine-readable media (e.g., non-transitory computer-readable media). The term "machine-readable media", as used herein, may refer to a single medium or multiple media (e.g., a centralized or distributed database and/or associated caches and server) that store the one or more sets of instructions 420. The term "machine-readable media", as used herein, may refer to any medium that is capable of storing, encoding, or carrying a set of instructions 420 for execution by computing device 400 and that cause computing device 400 to perform any one or more of the methodologies of the present disclosure.

Referring now to FIG. 5, FIG. 5 is a flowchart of non-limiting embodiments of a process 500 for dealiasing measurements of radar range rate using machine learning. In some non-limiting embodiments, one or more of the steps of process 500 may be performed (e.g., completely, partially, etc.) by radar dealiasing system 102 (e.g., one or more devices of radar dealiasing system 102, etc.). In some non-limiting embodiments, one or more of the steps of process 500 may be performed (e.g., completely, partially, etc.) by another device or a group of devices separate from or including radar dealiasing system 102, such as user device 104 and/or autonomous vehicle 106 (e.g., system architecture 200 of autonomous vehicle 106, etc.). In some non-limiting embodiments, while process 500 refers to the use of a radar range rate, process 500 may involve the use of range rate associated with LiDAR as opposed to, or addition to, radar range rate.

As shown in FIG. 5, at step 502, process 500 includes determining an unwrap factor for a measurement of radar range rate using a machine learning model. For example, radar dealiasing system 102 may determine the predicted value of an unwrap factor for a measurement of radar range rate using a trained machine learning model. In some non-limiting embodiments, radar dealiasing system 102 may receive the measurement of radar range rate from autonomous vehicle 106 (e.g., a radar of autonomous vehicle 106) that is operating in a real-time environment. For example, autonomous vehicle 106 may obtain a measurement of radar range rate of a target object while autonomous vehicle 106 is operating in a real-time environment and autonomous vehicle 106 may transmit the measurement to radar dealiasing system 102 via communication network 108. Radar dealiasing system 102 may receive the measurement based on autonomous vehicle 106 transmitting the measurement. In some non-limiting embodiments, radar dealiasing system 102 may determine the predicted value of an unwrap factor for the measurement of radar range rate based on receiving the measurement of radar range rate from autonomous vehicle 106.

In some non-limiting embodiments, when determining the predicted value of the unwrap factor for dealiasing the measurement of range rate using the trained machine learning model, radar dealiasing system 102 may provide an input to the trained machine learning model and may receive an output from the trained machine learning model based on the input. In some non-limiting embodiments, the output may include the predicted value of the unwrap factor. In some non-limiting embodiments, the predicted value of the unwrap factor is a value of the set $\{-K, \ldots 0, P\}$, where K or P may be equal to value of 1 or 2. In some non-limiting embodiments, the predicted value of the unwrap factor is a value of the set $\{-1, 0, 1\}$. In some non-limiting embodiments, the predicted value of the unwrap factor is a value of the set $\{-2, -1, 0, 1, 2\}$ or $\{-2, -1, 0, 1\}$ (e.g., an unsymmetric case).

In some non-limiting embodiments, the input may include data associated with measurements (e.g., compensated measurements) of radar range rate of a target object by a radar, data associated with variance of measurements of radar range rate of a target object by a radar, data associated with a detected position (e.g., position in a first direction, such as in an x-axis, position in a second direction, such as in a y-axis, variance of position in a first direction, variance of position in a second direction, covariance of position in a first direction and position in a second direction, etc.) of a target object by a radar, data associated with an azimuth angle (e.g., variance in azimuth angle) of a target object detected by a radar, data associated with velocity ambiguity of a target object, data associated with angular acceleration (e.g., angular acceleration in a first direction, such as in an x-axis, angular acceleration in a second direction, such as in an y-axis, angular acceleration in a third direction, such as in an z-axis, etc.) of an autonomous vehicle, data associated with angular velocity (e.g., angular velocity in a first direction, such as in an x-axis, angular velocity in a second direction, such as in an y-axis, angular velocity in a third direction, such as in an z-axis, etc.) of an autonomous vehicle, data associated with linear acceleration (e.g., linear acceleration in a first direction, such as in an x-axis, linear acceleration in a second direction, such as in an y-axis, linear acceleration in a third direction, such as in an z-axis, etc.) of an autonomous vehicle, data associated with linear velocity (e.g., linear velocity in a first direction, such as in an x-axis, linear velocity in a second direction, such as in an y-axis, linear velocity in a third direction, such as in an z-axis, etc.) of an autonomous vehicle, data associated with a tracked position (e.g., tracked position in a first direction, such as in an x-axis, tracked position in a second direction, such as in a y-axis, etc.) of a target object, data associated with a tracked linear velocity (e.g., tracked linear velocity in a first direction, such as in an x-axis, tracked linear velocity in a second direction, such as in a y-axis, etc.) of a target object, data associated with a tracked range rate of a target object by a radar, data associated with a time period during which a target object was tracked, data associated with a width of a target object that was tracked, data associated with a length of a target object that was tracked, or any combination thereof. In some non-limiting embodiments, the input may be extracted from raw data obtained by one or more sensors (e.g., radar, LiDAR, an image capture device, such as a video camera, etc.) of an autonomous vehicle (e.g., autonomous vehicle 106).

In some non-limiting embodiments, radar dealiasing system 102 may generate a machine learning model that is configured to provide a predicted value of an unwrap factor for dealiasing a measurement of radar range rate of a target object as an output. In some non-limiting embodiments, radar dealiasing system 102 may generate a trained machine learning model. For example, radar dealiasing system 102 may train a machine learning model based on the training dataset, where the training dataset comprises a plurality of data instances associated with operational events of one or more autonomous vehicles (e.g., autonomous vehicle 106). The plurality of data instances include a plurality of measurements (e.g., historical measurements) of characteristics, such as information regarding radar detection, autonomous vehicle egomotion, and states of tracked target objects, associated with the one or more autonomous vehicles.

In some non-limiting embodiments, the trained machine learning model may include a machine learning model designed to receive, as an input, a plurality of features (e.g., 30 features) extracted from a plurality of measurements (e.g., historical measurements) of characteristics associated with one or more autonomous vehicles, and provide, as an output, a predicted value of an unwrap factor for dealiasing a measurement of radar range rate of a target object as an output.

In some non-limiting embodiments, the plurality of features may include one or more features associated with measurements (e.g., compensated measurements) of radar range rate of a target object by a radar, one or more features associated with variance of measurements of radar range rate of a target object by a radar, one or more features associated with a detected position (e.g., position in a first direction, such as in an x-axis, position in a second direction, such as in a y-axis, variance of position in a first direction, variance of position in a second direction, covariance of position in a first direction and position in a second direction, etc.) of a target object by a radar, one or more features associated with an azimuth angle (e.g., variance in azimuth angle) of a target object detected by a radar, one or more features associated with velocity ambiguity of a target object, one or more features associated with angular acceleration (e.g., angular acceleration in a first direction, such as in an x-axis, angular acceleration in a second direction, such as in an y-axis, angular acceleration in a third direction, such as in an z-axis, etc.) of an autonomous vehicle, one or more features associated with angular velocity (e.g., angular velocity in a first direction, such as in an x-axis, angular velocity in a second direction, such as in an y-axis, angular velocity in a third direction, such as in an z-axis, etc.) of an autonomous vehicle, one or more features associated with linear acceleration (e.g., linear acceleration in a first direction, such as in an x-axis, linear acceleration in a second direction, such as in an y-axis, linear acceleration in a third direction, such as in an z-axis, etc.) of an autonomous vehicle, one or more features associated with linear velocity (e.g., linear velocity in a first direction, such as in an x-axis, linear velocity in a second direction, such as in an y-axis, linear velocity in a third direction, such as in an z-axis, etc.) of an autonomous vehicle, one or more features associated with a tracked position (e.g., tracked position in a first direction, such as in an x-axis, tracked position in a second direction, such as in a y-axis, etc.) of a target object, one or more features associated with a tracked linear velocity (e.g., tracked linear velocity in a first direction, such as in an x-axis, tracked linear velocity in a second direction, such as in a y-axis, etc.) of a target object, one or more features associated with a tracked range rate of a target object by a radar, one or more features associated with a time period during which a target object was tracked, one or more features associated with a width of a target object that was tracked, one or more features associated with a length of a target object that was tracked, or any combination thereof. In some non-limiting embodiments, the one or more features may be extracted from historical measurement data obtained by one or more sensors (e.g., a radar, a LiDAR, an image capture device, such as a video camera, etc.) of an autonomous vehicle (e.g., autonomous vehicle 106). In some non-limiting embodiments, radar dealiasing system 102 may store the trained machine learning model (e.g., for later use).

In some non-limiting embodiments, radar dealiasing system 102 may process data instances associated with operational events (e.g., historical data instances associated with operating an autonomous vehicle in a real-time environment) to obtain training data (e.g., a training dataset) for the machine learning model. For example, radar dealiasing system 102 may process the data to change the data into a format that may be analyzed (e.g., by radar dealiasing system 102) to generate the trained machine learning model. The data that is changed (e.g., the data that results from the change, such as feature data) may be referred to as training data. In some non-limiting embodiments, radar dealiasing system 102 may process the data instances associated with events to obtain the training data based on receiving the data instances. Additionally or alternatively, radar dealiasing system 102 may process the data to obtain the training data based on radar dealiasing system 102 receiving an indication, from a user (e.g., a user associated with user device 104) of radar dealiasing system 102, that radar dealiasing system 102 is to process the data, such as when radar dealiasing system 102 receives an indication to generate a machine learning model for predicting a value of an unwrap factor.

In some non-limiting embodiments, radar dealiasing system 102 may process data instances associated with operational events by determining a prediction variable based on the data. A prediction variable may include a metric, associated with operational events, which may be derived based on the data instances associated with operational events. The prediction variable may be analyzed to generate a trained machine learning model. For example, the prediction variable may include a variable associated with an operational event, such as a variable associated with a measured characteristic of an autonomous vehicle during an operational event, a variable associated with a number of occurrences of a measured characteristic of an autonomous vehicle during an operational event, and/or the like.

In some non-limiting embodiments, radar dealiasing system 102 may analyze the training data to generate the trained machine learning model. For example, radar dealiasing system 102 may use machine learning techniques to analyze the training data to generate the trained machine learning model. In some non-limiting embodiments, generating the trained machine learning model (e.g., based on training data) may be referred to as training a machine learning model. The machine learning techniques may include, for example, supervised and/or unsupervised techniques, such as decision trees, random forests, logistic regressions, linear regression, gradient boosting, support-vector machines, extra-trees (e.g., an extension of random forests), Bayesian statistics, learning automata, Hidden Markov Modeling, linear classifiers, quadratic classifiers, association rule learning, and/or the like. In some non-limiting embodiments, the machine learning model may include a model that is specific to a particular characteristic, for example, a model that is specific to a particular autonomous vehicle involved in an operational event, a particular time interval during which an operational event occurred, and/or the like.

In some non-limiting embodiments, the machine learning model is a random forest machine learning model, and radar dealiasing system 102 may train the random forest machine learning model based on a training dataset to provide the trained machine learning model. In some non-limiting embodiments, when training the random forest machine learning model, radar dealiasing system 102 may fit a plurality of random forest models on the training dataset by tuning hyperparameters, wherein the hyperparameters comprise a number of estimators, a maximum tree depth, and a plurality of sample weights. In this way, radar dealiasing system 102 may provide a random forest machine learning model that may utilize less resources when providing a predicted value of an unwrap factor as compared to other machine learning models. This is because the random forest machine learning model may not need to preprocess (e.g., providing scaling or impute missing values) features that have been extracted from raw data.

Additionally or alternatively, when analyzing the training data, radar dealiasing system 102 may identify one or more variables (e.g., one or more independent variables) as predictor variables (e.g., features) that may be used to make a prediction when analyzing the training data. In some non-limiting embodiments, values of the predictor variables may be inputs to a machine learning model. For example, radar dealiasing system 102 may identify a subset (e.g., a proper subset) of the variables as the predictor variables that may be used to accurately predict a classification of an input. In some non-limiting embodiments, the predictor variables may include one or more of the prediction variables, as discussed above, that have a significant impact (e.g., an impact satisfying a threshold) on a predicted classification of an input as determined by radar dealiasing system 102.

In some non-limiting embodiments, radar dealiasing system 102 may validate a machine learning model. For example, radar dealiasing system 102 may validate the machine learning model after radar dealiasing system 102 generates the machine learning model. In some non-limiting embodiments, radar dealiasing system 102 may validate the machine learning model based on a portion of the training data to be used for validation. For example, radar dealiasing system 102 may partition the training data into a first portion and a second portion, where the first portion may be used to generate the machine learning model, as described above. In this example, the second portion of the training data (e.g., the validation data) may be used to validate the machine learning model.

In some non-limiting embodiments, radar dealiasing system 102 may validate the machine learning model by providing validation data associated with an autonomous vehicle (e.g., data associated with one or more operational events involving an autonomous vehicle) as input to the machine learning model, and determining, based on an output of the machine learning model, whether the machine learning model correctly, or incorrectly, predicted a classification of an input. In some non-limiting embodiments, radar dealiasing system 102 may validate the machine learning model based on a validation threshold. For example, radar dealiasing system 102 may be configured to validate the machine learning model when the classifications of a plurality of inputs (as identified by the validation data) are correctly predicted by the machine learning model (e.g., when the machine learning model correctly predicts 50% of the classifications of a plurality of inputs, 70% of the classifications of a plurality of inputs, a threshold quantity of the classifications of a plurality of inputs, and/or the like).

In some non-limiting embodiments, radar dealiasing system 102 may validate a trained machine learning model by determining whether the trained machine learning satisfies a threshold value of accuracy with regard to a predicted value of an unwrap factor for dealiasing a measurement of range rate of the target object. In some non-limiting embodiments, if radar dealiasing system 102 does not validate the machine learning model (e.g., when a percentage of correctly predicted classifications of a plurality of events does not satisfy the validation threshold), then radar dealiasing system 102 may generate one or more additional machine learning models.

In some non-limiting embodiments, once the machine learning model has been validated, radar dealiasing system 102 may further train the machine learning model and/or generate new machine learning models based on receiving new training data. The new training data may include additional data associated with one or more events. In some non-limiting embodiments, the new training data may include data associated with an additional plurality of operational events. Radar dealiasing system 102 may use the machine learning model to predict the classifications of the additional plurality of events and compare an output of a machine learning model to the new training data. In such an example, radar dealiasing system 102 may update one or more trained machine learning models based on the new training data.

In some non-limiting embodiments, radar dealiasing system 102 may store the trained machine learning model. For example, radar dealiasing system 102 may store the trained machine learning model in a data structure (e.g., a database, a linked list, a tree, and/or the like). The data structure may be located within radar dealiasing system 102 or external (e.g., remote from) radar dealiasing system 102.

As shown in FIG. 5, at step 504, process 500 includes dealiasing the measurement of radar range rate. For example, radar dealiasing system 102 may dealiase a measurement value of range rate from a radar of autonomous vehicle 106 based on the predicted value of the unwrap factor. Radar dealiasing system 102 may dealiase the measurement value of radar range rate to provide a true value of radar range rate. In some non-limiting embodiments, radar dealiasing system 102 may determine the true value of range rate based on the predicted value of the unwrap factor, the measurement of radar range rate (e.g., the measurement of radar range rate from a radar of autonomous vehicle 106), and a value of velocity ambiguity.

For example, radar dealiasing system 102 may determine the true value of range rate according to the following equation:

$$v_{measure} = v_{true} + kB$$

where k is the unwrap factor and B is the velocity ambiguity. In order to obtain the true value of radar range rates, dealiasing may be performed on the measurement of radar range rate. In some non-limiting embodiments, radar dealiasing system 102 may determine a predicted value of the unwrap factor for each measurement of radar range rate and radar dealiasing system 102 may determine the true value of radar range rate for each measurement of radar range rate.

As shown in FIG. 5, at step 506, process 500 includes performing an action with an autonomous vehicle. For example, radar dealiasing system 102 may perform the action with autonomous vehicle 106. In some non-limiting embodiments, radar dealiasing system 102 may control an operation of autonomous vehicle 106 in a real-time environment. For example, radar dealiasing system 102 may control an operation of autonomous vehicle 106 in a real-time environment based on a true value of radar range rate. In some non-limiting embodiments, radar dealiasing system 102 may transmit a control signal to autonomous vehicle 106 to control an operational characteristic (e.g., velocity, acceleration, deceleration, etc.) of autonomous vehicle 106.

Referring now to FIGS. 6A-6D, FIGS. 6A-6D are diagrams of a non-limiting embodiment of an implementation of a process 600 (e.g., process 500) for dealiasing measurements of radar range rate using machine learning. As shown by reference number 605 in FIG. 6A, radar dealiasing system 102 may receive a log of data associated with operation of an autonomous vehicle (e.g., historical operation of an autonomous vehicle, such as autonomous vehicle 106). In some non-limiting embodiments, radar dealiasing system 102 may receive the log of data from autonomous vehicle 106, user device 104, and/or another device or system that is remote from radar dealiasing system 102.

In some non-limiting embodiments, the log of data associated with operation of an autonomous vehicle may include data associated with features relevant to the dealiasing of a measurement value of radar range rate. The features may be determined by a predefined correlation to the dealiasing of a measurement value of radar range rate. In some non-limiting embodiments, the log of data associated with operation of an autonomous vehicle may include data associated with features relevant to the dealiasing, which may be provided as input to the machine learning model. In some non-limiting embodiments or aspects, radar dealiasing system 102 may receive a log of data associated with operation of an autonomous vehicle (e.g., autonomous vehicle 106) in order to replay the log.

Figure 6A:
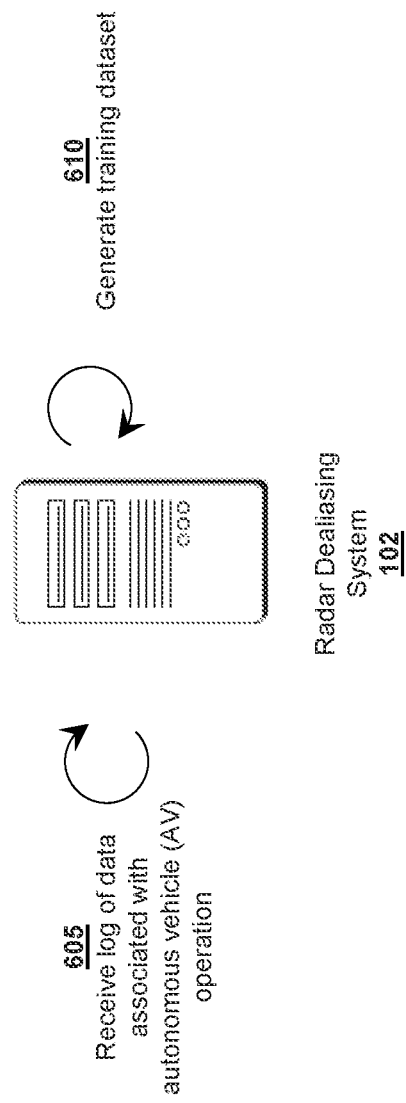

As further shown by reference number 610 in FIG. 6A, radar dealiasing system 102 may generate a training dataset. In some non-limiting embodiments, radar dealiasing system 102 may generate a training dataset by replaying logs of data associated with operation of an autonomous vehicle. For example, radar dealiasing system 102 may replay a log of data associated with operation of an autonomous vehicle where data associated with features relevant to dealiasing may be produced and extracted for use in the training dataset. In some non-limiting embodiments, the training dataset may include a plurality of measurements of characteristics associated with one or more autonomous vehicles.

In some non-limiting embodiments, radar dealiasing system 102 may train a random forest machine learning model based on the training dataset.

As shown by reference number 615 in FIG. 6B, radar dealiasing system 102 may generate a random forest machine learning model. In some non-limiting embodiments, radar dealiasing system 102 may generate a random forest machine learning model by training the random forest machine learning model based on a training dataset. In some non-limiting embodiments, when training the random forest machine learning model, radar dealiasing system 102 may fit a plurality of random forest models on the training dataset by tuning hyperparameters, wherein the hyperparameters comprise a number of estimators, a maximum tree depth, and a plurality of sample weights.

As further shown by reference number 620 in FIG. 6B, radar dealiasing system 102 may determine a predicted value of an unwrap factor using the machine learning model. In some non-limiting embodiments, the machine learning model is a trained machine learning model configured to provide a predicted value of the unwrap factor for dealiasing a measurement of range rate of a target object as an output. In some non-limiting embodiments, radar dealiasing system 102 may dealiase a measurement value of range rate from a radar of autonomous vehicle 106 based on the predicted value of the unwrap factor to provide a true value of range rate. In some non-limiting embodiments, radar dealiasing system 102 may validate the machine learning model to determine whether the machine learning satisfies a threshold value of accuracy with regard to the predicted value of the unwrap factor.

Figure 6C:
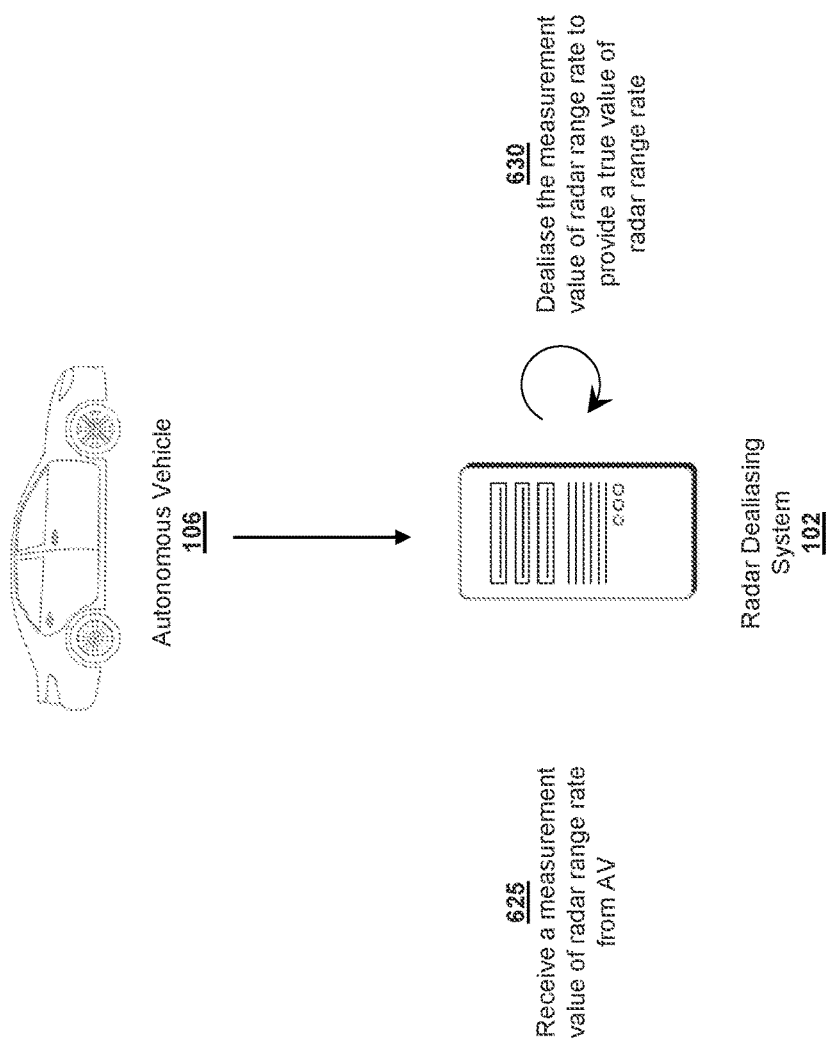

As shown by reference number 625 in FIG. 6C, radar dealiasing system 102 may receive a measurement value of radar range rate from autonomous vehicle 106. In some non-limiting embodiments or aspects, the measurement value of radar range rate from autonomous vehicle 106 may be aliased. The measurement value of radar range rate from autonomous vehicle 106 may correspond to a value of velocity ambiguity. In some non-limiting embodiments, the measurement value of radar range rate from autonomous vehicle 106 may correspond to data that represents features relevant to the dealiasing of the measurement value of radar range rate. For example, the measurement value of radar range rate from autonomous vehicle 106 may correspond to a radar detection variance, a vehicle linear acceleration, a tracked linear velocity, and/or the like.

As further shown by reference number 630 in FIG. 6C, radar dealiasing system 102 may dealiase the measurement value of radar range rate to provide a true value of radar range rate. In some non-limiting embodiments, radar dealiasing system 102 may dealiase the measurement value of radar range rate from a radar of autonomous vehicle 106 based on the predicted value of the unwrap factor to provide a true value of range rate. In some non-limiting embodiments, when dealiasing the measurement value of radar range rate, radar dealiasing system 102 may determine the true value of range rate based on the predicted value of the unwrap factor, the measurement of range rate from the radar of autonomous vehicle 106, and a value of velocity ambiguity.

Figure 6D:
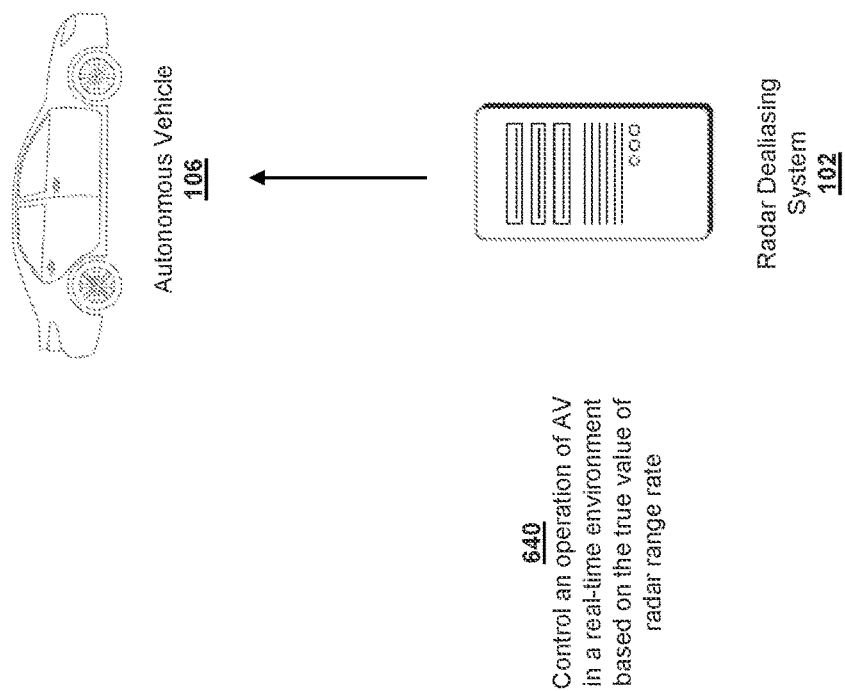

As shown by reference number 640 in FIG. 6D, radar dealiasing system 102 may control an operation of autonomous vehicle 106 in a real-time environment based on the true value of radar range rate. In some non-limiting embodiments, radar dealiasing system 102 may control an operational characteristic of autonomous vehicle 106, such as velocity, by transmitting a control signal to increase or decrease the velocity (e.g., the linear velocity) of autonomous vehicle 106 based on the true value of radar range rate.

Although embodiments have been described in detail for the purpose of illustration and description, it is to be understood that such detail is solely for that purpose and that embodiments are not limited to the disclosed embodiments, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A system, the system comprising:
a memory; and
at least one processor coupled to the memory and configured to:
use a machine learning model to determine a predicted value of an unwrap factor, wherein the machine learning model is a random forest machine learning model configured to provide a predicted value of an unwrap factor for dealiasing a measurement of range rate of a target object as an output;
dealiase a measurement value of range rate from a radar of an autonomous vehicle (AV) based on the predicted value of the unwrap factor to provide a true value of range rate;
control an operation of the AV in a real-time environment based on the true value of range rate; and
train the random forest machine learning model based on a training dataset, wherein the training dataset comprises a plurality of measurements of characteristics associated with one or more AVs.

2. The system of claim 1, wherein the true value of range rate is based on the predicted value of the unwrap factor, the measurement of range rate from the radar of the AV, and a value of velocity ambiguity.

3. The system of claim 1, wherein, when determining the predicted value of the unwrap factor for dealiasing the measurement of range rate using the trained machine learning model, the at least one processor is configured to:
provide an input to the trained machine learning model, wherein the input comprises:
data associated with variance of measurements of range rate of a target object;
data associated with a detected position of a target object;
data associated with an azimuth angle of a target object;
data associated with velocity ambiguity of a target object;
data associated with angular acceleration of the AV;
data associated with angular velocity of the AV;
data associated with linear acceleration of the AV;
data associated with linear velocity of the AV;
data associated with a tracked position of a target object;
data associated with a tracked linear velocity of a target object;
data associated with a tracked range rate of a target object;
data associated with a time period during which a target object was tracked;
data associated with a width of a target object that was tracked;

data associated with a length of a target object that was tracked; or any combination thereof; and receive an output from the trained machine learning model based on the input, wherein the output comprises the predicted value of the unwrap factor.

4. The system of claim 1, wherein, when training the random forest machine learning model, the at least one processor is configured to:

fit a plurality of random forest models on the training dataset by tuning a plurality of hyperparameters, wherein the plurality of hyperparameters comprise a number of estimators, a maximum tree depth, and a plurality of sample weights.

5. The system of claim 1, wherein the at least one processor is further configured to:

validate the trained machine learning model, wherein the trained machine learning is valid when the trained machine learning satisfies a threshold value of accuracy with regard to a predicted value of an unwrap factor for dealiasing a measurement of range rate of the target object.

6. The system of claim 1, wherein the trained machine learning model is configured to provide a predicted value of an unwrap factor, wherein the predicted value of the unwrap factor is a value of a set $\{-1, 0, 1\}$.

7. A computer program product comprising at least one non-transitory computer-readable medium comprising one or more instructions that, when executed by at least one processor, cause the at least one processor to:

determine a predicted value of an unwrap factor using a machine learning model, wherein the machine learning model is a trained machine learning model configured to provide a predicted value of an unwrap factor for dealiasing a measurement of range rate of a target object as an output, wherein the predicted value of the unwrap factor is a value of a set $\{-1, 0, 1\}$;

dealiase a measurement value of range rate based on the predicted value of the unwrap factor to provide a true value of range rate; and control an operation of an autonomous vehicle (AV) in a real-time environment based on the true value of range rate.

8. The computer program product of claim 7, wherein, the one or more instructions that cause the at least one processor to dealiase the measurement value of range rate from the radar of the AV, cause the at least one processor to:

determine the true value of range rate based on the predicted value of the unwrap factor, the measurement of range rate from the radar of the AV, and a value of velocity ambiguity.

9. The computer program product of claim 7, wherein, the one or more instructions that cause the at least one processor to determine the predicted value of the unwrap factor for dealiasing the measurement of range rate using the machine learning model, cause the at least one processor to:

provide an input to the machine learning model, wherein the input comprises:

data associated with variance of measurements of range rate of a target object;

data associated with a detected position of a target object;

data associated with an azimuth angle of a target object;

data associated with velocity ambiguity of a target object;

data associated with angular acceleration of the AV;

data associated with angular velocity of the AV;

data associated with linear acceleration of the AV;

data associated with linear velocity of the AV;

data associated with a tracked position of a target object;

data associated with a tracked linear velocity of a target object;

data associated with a tracked range rate of a target object;

data associated with a time period during which a target object was tracked;

data associated with a width of a target object that was tracked;

data associated with a length of a target object that was tracked; or any combination thereof; and receive an output from the machine learning model based on the input, wherein the output comprises the predicted value of the unwrap factor.

10. The computer program product of claim 7, wherein the machine learning model is a random forest machine learning model, and wherein the one or more instructions further cause the at least one processor to:

train the random forest machine learning model based on a training dataset, wherein the training dataset comprises a plurality of measurements of characteristics associated with one or more AVs.

11. The computer program product of claim 10, wherein, the one or more instructions that cause the at least one processor to train the random forest machine learning model, cause the at least one processor to:

fit a plurality of random forest models on the training dataset by tuning a plurality of hyperparameters, wherein the plurality of hyperparameters comprise a number of estimators, a maximum tree depth, and a plurality of sample weights.

12. The computer program product of claim 7, wherein the one or more instructions further cause the at least one processor to:

validate the machine learning model to determine whether the machine learning satisfies a threshold value of accuracy with regard to a predicted value of an unwrap factor for dealiasing a measurement of range rate of the target object.

13. A computer-implemented method, the method comprising:

determining, with at least one processor, a predicted value of an unwrap factor using a machine learning model, wherein the machine learning model is a random forest machine learning model configured to provide a predicted value of an unwrap factor for dealiasing a measurement of range rate of a target object as an output;

dealiasing, with at least one processor, a measurement value of range rate based on the predicted value of the unwrap factor to provide a true value of range rate; and controlling, with at least one processor, an operation of an autonomous vehicle (AV) in a real-time environment based on the true value of range rate; and training the random forest machine learning model based on a training dataset, wherein the training dataset comprises a plurality of measurements of characteristics associated with one or more AVs.

14. The computer-implemented method of claim 13, wherein dealiasing the measurement value of range rate comprises:

determining the true value of range rate based on the predicted value of the unwrap factor, the measurement of range rate, and a value of velocity ambiguity.

15. The computer-implemented method of claim 13, wherein determining the predicted value of the unwrap factor for dealiasing the measurement of range rate using the machine learning model comprises:

provriding an input to the machine learning model, wherein the input comprises:

data associated with variance of measurements of range rate of a target object;

data associated with a detected position of a target object;

data associated with an azimuth angle of a target object;

data associated with velocity ambiguity of a target object;

data associated with angular acceleration of the AV;

data associated with angular velocity of the AV;

data associated with linear acceleration of the AV;

data associated with linear velocity of the AV;

data associated with a tracked position of a target object;

data associated with a tracked linear velocity of a target object;

data associated with a tracked range rate of a target object;

data associated with a time period during which a target object was tracked;

data associated with a width of a target object that was tracked;

data associated with a length of a target object that was tracked; or any combination thereof; and receiving an output from the machine learning model based on the input, wherein the output comprises the predicted value of the unwrap factor.

16. The computer-implemented method of claim 13, wherein training the random forest machine learning model comprises:

fitting a plurality of random forest models on the training dataset by tuning a plurality of hyperparameters, wherein the plurality of hyperparameters comprise a number of estimators, a maximum tree depth, and a plurality of sample weights.

17. The computer-implemented method of claim 13, further comprising:

validating the machine learning model to determine that the machine learning satisfies a threshold value of accuracy with regard to a predicted value of an unwrap factor for dealiasing a measurement of range rate of the target object.

* * * * *